Jan. 15, 1957     J. E. CHAPMAN ET AL     2,777,524
RAM AIR DRIVEN TURBINE
Filed June 1, 1953     2 Sheets-Sheet 1
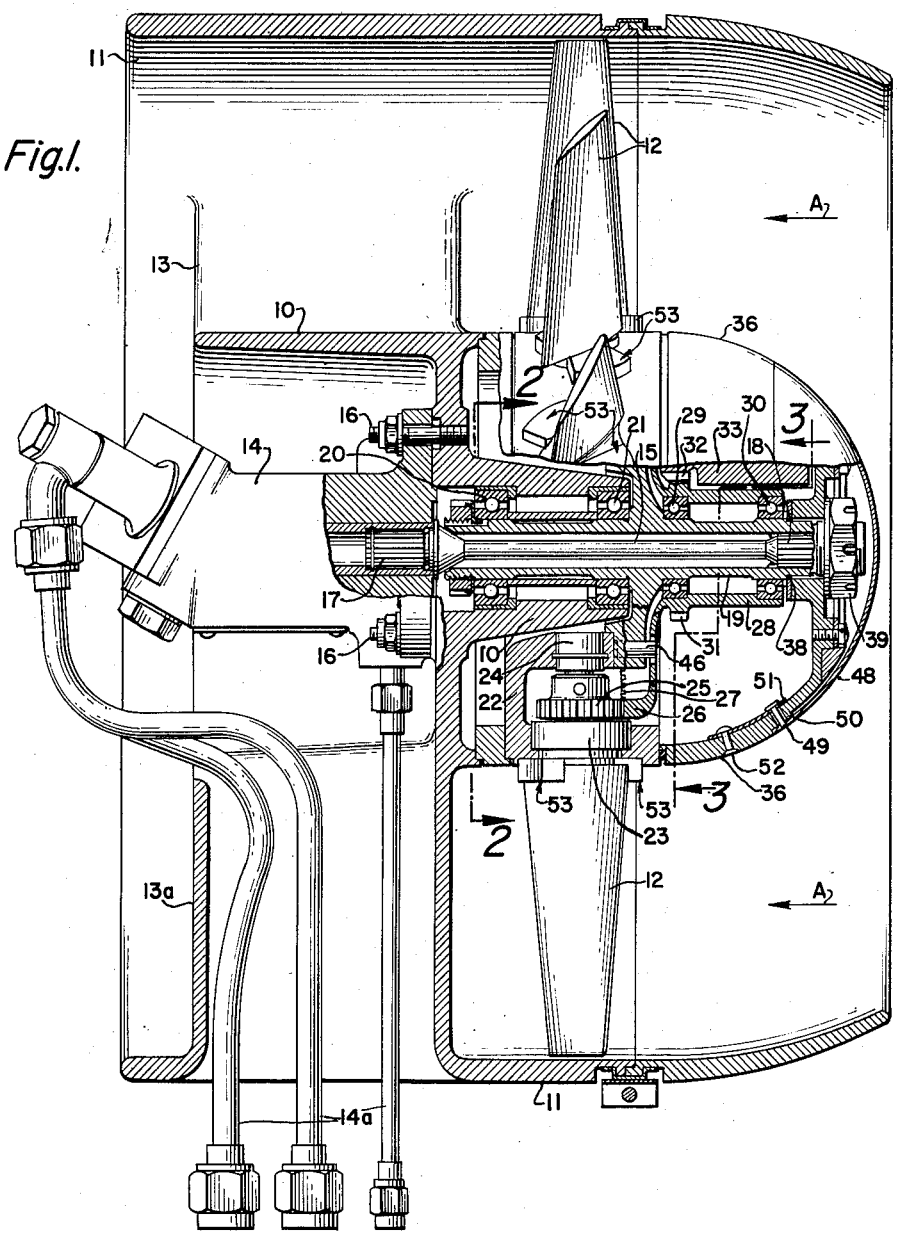
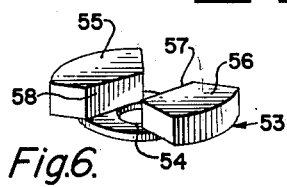
JAMES E. CHAPMAN,
CHARLES F. DREXEL,
JAMES E. YOUNG,
      INVENTORS.
BY John H.I. Wallace Jan. 15, 1957        J. E. CHAPMAN ET AL        2,777,524
RAM AIR DRIVEN TURBINE
Filed June 1, 1953                              2 Sheets-Sheet 2
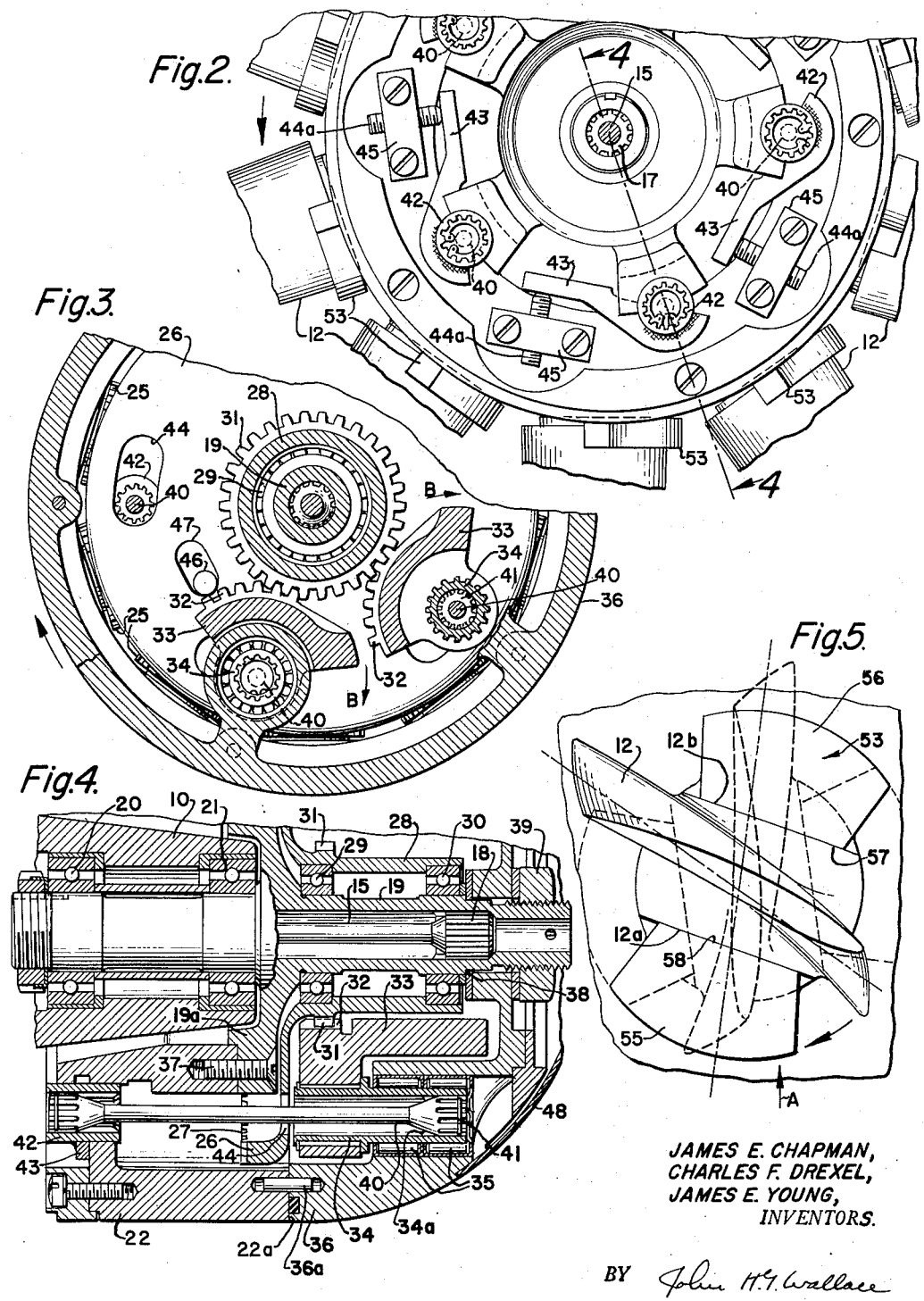
JAMES E. CHAPMAN,
CHARLES F. DREXEL,
JAMES E. YOUNG,
            INVENTORS.
BY John H. Y. Wallace

United States Patent Office 2,777,524
Patented Jan. 15, 1957

2,777,524

RAM AIR DRIVEN TURBINE

James E. Chapman, Charles F. Drexel, and James E. Young, Los Angeles, Calif., assignors to The Garrett Corporation, Los Angeles, Calif., a corporation of California Application June 1, 1953, Serial No. 358,636

10 Claims. (Cl. 170—68)

This invention relates to turbines and more particularly to a ram air turbine for use in connection with aircraft to provide emergency power for operating various accessories or equipment.

It has been recognized by those skilled in the art, that an emergency ram air turbine, in order to be useful in operating various aircraft equipment, must be very simple, reliable, compact, and must operate at a constant speed within reasonably close tolerances. To meet such requirements various devices have been produced. Some of the prior art devices are quite bulky while others fail to operate within the designed speed tolerances. Ram air turbines may be used to provide power to operate emergency hydraulic equipment or to drive any other equipment, such as for example, a source of electrical power. It is also recognized that in the event of an emergency, a turbine must be capable of rapidly reaching its operating speed when suddenly exposed to an air stream.

It is an object of the present invention to provide a ram air turbine which maintains a substantially constant speed of its output shaft when operated in connection with aircraft capable of traveling within a wide range of subsonic and supersonic speeds.

Another object of the invention is to provide a ram air turbine which is very compact in proportion to its power output and the wide range of air speed through which it is capable of operating while maintaining a constant speed of its output shaft.

A further object of the invention is to provide a ram air turbine having means for centrifugal pitch adjustment of the blades which is resisted by a compact arrangement of torsion bars for returning the blades to a compensating pitch position when the rotational speed of the turbine is reduced, whereby substantially constant speed of the turbine output shaft is maintained throughout an extensive range of air speeds to which said air turbine is subjected.

Another object of the invention is to provide a ram air turbine which, in an emergency, responds very quickly to an air stream admitted to the blades thereof and rapidly reaches operating speed.

Another object of the invention is to provide a ram air turbine having novel means for counterbalancing centrifugal torsion developed by rotation of the turbine blades about the turbine axis.

Still another object of the invention is to provide a very simple and compact, yet powerful, centrifugal blade pitch adjusting mechanism which is very reliable and which operates to maintain constant turbine speed, even though the turbine is subjected to a wide range of air speeds at various altitudes.

A further object of the invention is to provide a ram air turbine wherein stop means is provided for restraining pre-stressed torsion bars which tend to resist operation of centrifugal pitch adjusting mechanism and wherein the stop means serves to provide a preliminary pitch setting of the turbine blades.

These and other objects will be apparent from the following specification and claims in view of the accompanying drawings in which:

Fig. 1 is an axial sectional view of the ram air turbine of the invention showing parts in elevation;

Fig. 2 is an enlarged fragmentary sectional view taken from the line 2—2 of Fig. 1 certain parts being omitted to make other parts visible;

Fig. 3 is an enlarged fragmentary sectional view taken from the line 3—3 of Fig. 1 and showing certain similar elements on different sectional planes;

Fig. 4 is a fragmentary sectional view taken from the line 4—4 of Fig. 2;

Fig. 5 is an end view of a turbine blade showing the connected structure fragmentarily and on an enlarged scale and further showing by broken lines a varying pitch position of the blade; and Fig. 6 is a perspective view of a centrifugal torsion counterweight for the turbine blades.

As shown in the drawings the turbine is provided with a frame 10 having a hollow cylindrical casing 11 surrounding the blades 12. The extremities of the blades extend into close proximity with the inner wall of the casing. The casing is supported by any means desired which may be capable of retractably supporting the turbine in connection with an aircraft wing or fuselage structure, for example, whereby the turbine may be projected into the air stream during its emergency operation. The frame 10 is provided with radially disposed struts 13 and 13a which support the casing 11 in concentric spaced relationship thereto. The strut 13a provides a conduit for tubes 14a connected to a hydraulic pump 14. Pump 14 is fixed to the frame 10 and is driven by a quill shaft 15 connected to the turbine blade spinner assembly. Bolts 16 connect the pump 14 to the frame 10. It will be understood that the quill shaft 15 may operate an alternator or other means which may be connected to the frame 10 instead of the pump 14.

The quill shaft 15 is provided with a spline end 17 operatively connected with the pump 14. The opposite end of the shaft 15 is provided with a spline portion 18 connected with a hollow shaft 19 which is supported in the frame 10 by means of bearings 20 and 21. Carried by the hollow shaft 19 is a spinner frame 22 which supports the blades 12 in substantially radial disposition to the axis of the hollow shaft 19. Each blade 12 is pivotally mounted in the frame 22 by means of outboard and inboard bearings 23 and 24 respectively. Fixed to each blade 12 is a spur gear 25 located between the outboard and inboard bearings 23 and 24. A ring gear 26 is provided with gear teeth 27 in mesh with gear teeth of the spur gears 25 as shown best in Figs. 1 and 4 of the drawings. The ring gear 26 is provided with a hollow cylindrical portion 28 mounted on bearings 29 and 30 carried externally of the hollow shaft 19. The ring gear 26 is provided on the outer side of its cylindrical portion 28 with a spur gear 31 which meshes with gear teeth 32 of centrifugal flyweights 33 (see particularly Fig. 3), the flyweights being mounted on sleeves 34 (Fig. 4) rotatably supported in roller bearings 35 carried by a frontal section 36 of the spinner frame 22. The spinner frame 22 is connected to a flange 19a of the hollow shaft 19 by means of screws 37. The frontal section 36 of the spinner frame 22 is maintained in abutment with a shoulder 38 of the hollow shaft 19 by means of a nut 39 screw threaded on the extended end of the shaft 19. The frontal section 36 abuts the end 22a of the spinner frame 22, and dowel pins 36a interengaging the spinner frame 22 and its frontal section 36 prevent relative rotation thereof.

Each of the sleeves 34 is provided with an internal spline portion 34a engaging external splines 41 on one end of a torsion bar 40. Each of the torsion bars, at its opposite end, as shown particularly in Fig. 2 engages a sleeve 42 on which is fixed a stop arm 43. As shown in Fig. 4 the torsion bar 40 is elongated and extends through an opening or arcuate slot 44 in the ring gear 26. Arms 43 connected to the sleeves 42 are engaged by adjustable stop screws 44a which are screw threaded in blocks 45 carried by the spinner frame 22. The stop screws 44a are arranged to provide adjustment of the torsion bars 40 in order to pre-load the same against a stop pin 46 (Fig. 3) fixed to the spinner frame 22 and projecting against the end of slot 47 in the ring gear 26. By means of the stop pin 46 in its engaged relation with the slotted portion 47 of the ring gear 26, the torsion bars are each restrained at one end, while their opposite ends are adjusted by means of the stop screws 44a, thereby prestressing the torsion bars as desired.

The forward end of the spinner frame assembly is enclosed by a cap 48 which is held in place by detents 49 projecting through openings 50 as shown best in Fig. 1. The detents 49 are provided with plate spring retainers 51 secured by rivets 52 to the frontal section 36 of the spinner frame 22.

High speed rotation of the blades 12 around the shaft creates centrifugal torsion of the blades about their axes. Therefore, the counterweights 53 as shown in Fig. 6 are provided to compensate for such centrifugal torsion forces upon the blades. The counterweights 53 are positioned at the outer portion of the spinner frame 22 adjacent the bearing 23 supporting each blade 12. Each counterweight 53 is provided with an opening 54 surrounding the shaft of the respective blade 12. The weight portions 55 and 56 are provided with opposed faces 57 and 58 engaging flat portions 12a and 12b on each blade 12 as shown best in Fig. 5.

In operation the frame 10 and casing 11, of the ram air turbine, may be connected to any suitable structure for supporting the same in the air stream adjacent an aircraft. The ram air turbine may be retractably mounted on the fuselage or wing structure of an airplane, permitting it to be extended into the air stream when an emergency arises. The turbine may also be arranged in a fixed duct internally of the aircraft wing or fuselage structure wherein ram air may be admitted to the turbine as desired. When ram air is flowing through the casing 11 as indicated by arrows A in Fig. 1, the blades 12 are rotated, together with the spinner frame 22, frontal section 36, ring gear 26, centrifugal flyweights 33, shafts 15 and 19, and torsion bars 40. Rotary motion of the shaft 15 is thus transmitted to the pump 14 which provides for hydraulic actuation of various equipment during an emergency. The frame 10, by means of the bearings 20 and 21, supports the rotating blade and spinner structure 22 and also supports the pump 14 in fixed position and relative thereto.

When the speed of the air, as indicated by arrows A, increases beyond a predetermined relative velocity, the blades 12 tend to rotate the spinner assembly including the spinner frame 22 at a greater speed. When the rotational speed of the spinner frame 22 increases, the centrifugal flyweights 33, due to their eccentric position, tend to pivot about the axes of the sleeves 34 in the direction as indicated by arrows B in Fig. 3. When such rotational movement of the flyweights 33 occurs, the gear portions 32 thereof in mesh with the spur gear 31 cause rotation of the ring gear 26 in mesh with the spur gears 25 on the blades 12. Rotary motion of the spur gears 25 caused by rotation of the flyweights 33 in the direction of arrows B changes the pitch of the blades 12 to decrease the angle of attack and thereby decrease the rotational force applied to the blades by the air moving at increased velocity through the casing 11. When the centrifugal flyweights 33 move in the direction of arrows B they transmit rotary motion to the spline ends 41 of the torsion bars 40, which are restrained at their opposite ends by means of the arms 43 abutting the stop screws 44a. Due to such restraint imposed by the arms 43, the bars 40 are torsionally deflected or twisted intermediate their ends causing them to resist further movement of the centrifugal flyweights in the direction of the arrows B. It will be understood that pitch adjustment of the blades 12 is therefore proportional to the rotational speed of the turbine which in turn depends on the velocity of the air traveling through the casing 11 and on the load upon the turbine. When such air velocity decreases, the torsional force of the bars 40 causes the centrifugal flyweights 33 to be shifted or rotated in a direction opposite to the arrows B, which reverses the operation of the gear portions 32 relative to the spur gear 31 and the ring gear 26 meshing with the spur gears 25 secured to the blades 12. As shown in Fig. 2 there are several torsion bars 40 all of which co-operate to provide very powerful resistance to the operation of the centrifugal flyweights 33 during an increase in the speed of the air relative to the blade itself. Such a powerful torsion bar arrangement makes it possible to utilize centrifugal flyweights developing a large centrifugal force when operated at high speed. It will be noted that the torsion bars 40 extend through slots 44 in the ring gear 26 and that the torsional axes of the bars 40 are substantially parallel to the shaft 19 or to the rotational axis of the blade-carrying spinner assembly of the turbine. The particular disposition of the torsion bars 40, and their compact arrangement relative to the flyweights 33 and the gear actuating mechanism associated therewith, provides for very powerful and highly responsive action of the pitch adjusting mechanism controlling the blades of the ram air turbine. The blades are quite long and are provided with considerable surface area in order to cause rapid response of the turbine to the air stream, for quickly operating the pump 14, in order to provide emergency power for actuation of the various equipment such as landing gear mechanism or the like.

When the turbine is initially put in the air stream, the inertia of the flyweights 33 and of the ring gear 26 causes them to resist rotation so that they tend to rotate with respect to the blades 12. Accordingly, the flyweights and the ring gear tend to adjust the pitch of the blades almost instantaneously in an anticipatory manner in a direction to reduce the turbine speed, and consequently the turbine reaches its operating speed very rapidly without hunting or overshooting. A similar action occurs upon sudden changes in turbine load or relative air speed.

As shown in Fig. 2 of the drawings the stop screws 44a provide for pivotal adjustment of the arms 43 about the axes of the torsion bars 40 so that a pre-load may be imposed upon the torsion bars. The torsion bars transmit force through the gear portions 32, spur gear 31, and ring gear 26 to the pin 46 in the slot 47 of the ring gear as hereinbefore described. This arrangement provides for sufficient pre-loading of the torsion bars 40 and permits adjusting the speed control range and prevents looseness or vibration of the pitch adjusting mechanism and the blades 12 controlled thereby.

The counterweights 53 counteract and prevent centrifugal torsion forces in the blades 12 from affecting the balanced operation of the torsion bars 40 relative to the centrifugal flyweights 33.

Hydraulic fluid circulated by the pump 14 is ducted through tubular lines 14a extended through the hollow strut 13a. In the event the turbine is to be used as an alternator drive the electrical conductors extending therefrom may be extended through the strut 13a.

What is claimed is:

1. In a constant speed turbine, a rotatable shaft, a plurality of adjustable pitch blades rotatable about the axis of said shaft, a pitch adjusting member having means rotatably coupling all of said blades, centrifugal flyweights disposed for swinging movement about axes located eccentric to and substantially parallel with said shaft, said flyweights being rotatably coupled to said pitch adjusting member and a plurality of torsion members spaced radially from said shaft, said torsion members having torsion axes substantially coinciding with the axes of swinging movement of said flyweights, said torsion members being coupled to said flyweights and to said pitch adjusting member, whereby said torsion members tend to resist the centrifugal force developed by said flyweights when rotating.

2. In an air driven turbine, a shaft, a spinner frame surrounding said shaft, a plurality of blades rotatable around the axis of said shaft and pivotally mounted on said frame about axes disposed substantially radial to said shaft, gear means connected with each of said blades, a ring gear meshing with all of said gear means, spur gear means carried by said ring gear, centrifugal flyweights pivotally mounted on said frame for swinging movement about axes located eccentric to and in axially parallel relation with said shaft, said flyweights having gear elements formed thereon and meshing with said spur gear means, and torsion members connected with said centrifugal flyweights and adapted to resist the centrifugal force thereof.

3. In an air driven turbine, a shaft, a spinner frame surrounding said shaft, a plurality of blades rotatable around the axis of said shaft and pivotally mounted on said frame about axes disposed substantially radial to said shaft, gear means connected with each of said blades, a ring gear meshing with all of said gear means, spur gear means carried by said ring gear, centrifugal flyweights pivotally mounted on said frame in axially parallel relation to said shaft and having gear elements in mesh with said spur gear means, and torsion members spaced radially from said shaft and connected with said centrifugal flyweights and adapted to resist the centrifugal force thereof, the axes of said torsion members coinciding substantially with the pivotal axes of said flyweights.

4. In an air driven turbine, a shaft, a spinner frame surrounding said shaft, a plurality of blades rotatable around the axis of said shaft and pivotally mounted on said frame about axes disposed substantially radial to said shaft, gear means connected with each of said blades, a ring gear meshing with all of said gear means, spur gear means carried by said ring gear, centrifugal flyweights pivotally mounted on said frame in axially parallel relation to said shaft and having gear elements in mesh with said spur gear means, torsion members spaced radially from said shaft and connected with said centrifugal flyweights and adapted to resist the centrifugal force thereof, and means for adjusting portions of said torsion members relative to said frame to vary the initial stress of said torsion members.

5. In a ram air driven turbine, a shaft, a spinner frame surrounding said shaft, a plurality of blades rotatable around the axis of said shaft and pivotally mounted on said frame about axes disposed substantially radial to said shaft, gear means connected with each of said blades, a ring gear meshing with all of said gear means, spur gear means carried by said ring gear, centrifugal flyweights pivotally mounted on said frame and having gear elements in mesh with said spur gear means, elongated torsion bars, each being connected at one of its ends with one of said centrifugal flyweights and adapted to resist the centrifugal force thereof, and adjustable stop means connected with the opposite ends of said elongated torsion bars for restraining portions thereof, relative to said frame, in opposition to force applied by said flyweights.

6. In an air driven turbine, a shaft, a spinner frame surrounding said shaft, a plurality of blades rotatable around the axis of said shaft and pivotally mounted on said frame about axes disposed substantially radial to said shaft, gear means connected with each of said blades, a ring gear meshing with all of said gear means, spur gear means carried by said ring gear, centrifugal flyweights pivotally mounted on said frame and having gear elements in mesh with said spur gear means, elongated torsion bars, each being connected at one of its ends with one of said centrifugal flyweights and adapted to resist the centrifugal force thereof, and adjustable stop means connected with the opposite ends of said torsion bars for restraining portions thereof, relative to said frame, in opposition to force applied by said flyweights, said ring gear having openings through which intermediate portions of said torsion bars extend.

7. In a fluid operated turbine, a support; a shaft journalled in said support for rotary motion; a frame carried by said shaft for rotation therewith; a plurality of blades journalled on said frame for adjustment about axes extending substantially radially from said shaft; means responsive to centrifugal force for adjusting said blades, said means having a plurality of flyweights journalled in said frame for swinging movement about axes disposed eccentric to and parallel with said shaft; motion transmitting means having parts formed with said flyweights for transmitting motion from the latter to said blades; and torsion bars having axes coinciding with the axes of movement of said flyweights, each of said torsion bars being anchored at one end to said frame and at the other end to a flyweight.

8. In a fluid operated turbine, a support; a shaft journalled in said support for rotary motion; a frame carried by said shaft for rotation therewith; a plurality of blades journalled on said frame for adjustment about axes extending substantially radially from said shaft; means responsive to centrifugal force for adjusting said blades, said means having a plurality of flyweights journalled in said frame for swinging movement about axes disposed eccentric to and parallel with said shaft; motion transmitting means having parts formed with said flyweights for transmitting motion from the latter to said blades; a plurality of torsion bars, each bar being disposed with the axis thereof coinciding with the axis of movement of a flyweight; means anchoring one end of each torsion bar to said frame and the other end to a flyweight, the means anchoring the bars to the frame being adjustable to vary the initial stress applied to said torsion members.

9. In a fluid operated turbine, a support; a shaft journalled in said support for rotary motion; a frame carried by said shaft for rotation therewith; a plurality of blades journalled on said frame for adjustment about axes extending substantially radially from said shaft; means responsive to centrifugal force for adjusting said blades, said means having flyweight means journalled in said frame for swinging movement about axes disposed eccentric to and parallel with said shaft; gear means transmitting motion from said flyweight means to said blades, a portion of said gear means being formed with said flyweight means; means limiting the operation of said gear means in one direction; torsion bar means for resisting the centrifugal action of said flyweight means, the axes of said torsion bar means coinciding with the axes of movement of said flyweight means; means anchoring one end of said torsion bar means to said frame and the other end to said flyweight means; and means for adjusting the end of said torsion bar means anchored to said frame to vary the initial stress of said torsion bar means.

10. In a fluid operated turbine, a support; a shaft journalled in said support for rotary motion; a frame carried by said shaft for rotation therewith; a plurality of blades journalled on said frame for adjustment about axes extending substantially radially from said shaft; means responsive to centrifugal force for adjusting said blades, said means having a plurality of flyweights journalled in said frame for swinging movement about axes disposed parallel to said shaft in a circle concentric therewith; motion transmitting means connecting said blades and flyweights, said motion transmitting means having gears connected with said blades; a gear sector on each of said flyweights; a member journalled for rotary motion about the axis of said shaft, said member having gear means meshing with the blade gears and said sector; means yieldably opposing the swinging movement of said flyweights, said means having a plurality of torsion bars, each being disposed with the axis thereof coinciding with the axis of swinging movement of a flyweight, said torsion bars projecting through openings in said member; and means anchoring one end of each torsion bar to said frame and the other end to the respective flyweight.

References Cited in the file of this patent

UNITED STATES PATENTS

| | | |
|---|---|---|
| 1,401,651 | Scharnagel | Dec. 27, 1921 |
| 1,636,434 | Pinaud | July 19, 1927 |
| 1,768,784 | Pinaud | July 1, 1930 |
| 1,919,586 | Dodge | July 25, 1933 |
| 2,054,947 | Riddle | Sept. 22, 1936 |
| 2,221,613 | DeLavaud | Nov. 12, 1940 |
| 2,294,868 | Bottrill | Sept. 1, 1942 |
| 2,382,229 | Humphreys | Aug. 14, 1945 |

FOREIGN PATENTS

| | | |
|---|---|---|
| 510,307 | Belgium | Apr. 15, 1952 |